(12) United States Patent
Zilberman

(10) Patent No.: US 6,341,958 B1
(45) Date of Patent: Jan. 29, 2002

(54) METHOD AND SYSTEM FOR ACQUIRING A FOREIGN LANGUAGE

(76) Inventor: Arkady G. Zilberman, 233 Ravine Ridge Dr. N., Powell, OH (US) 43065

( * ) Notice: Subject to any disclaimer, the term of this patent is extended or adjusted under 35 U.S.C. 154(b) by 0 days.

(21) Appl. No.: 09/778,456

(22) Filed: Feb. 7, 2001

Related U.S. Application Data

(63) Continuation of application No. 09/435,660, filed on Nov. 8, 1999, now abandoned.

(51) Int. Cl.[7] .............................................. G09B 19/06
(52) U.S. Cl. ....................................................... 434/157
(58) Field of Search ................................ 434/157, 162, 434/165, 167, 178, 185, 322, 323, 353

(56) References Cited

U.S. PATENT DOCUMENTS

| | | | |
|---|---|---|---|
| 3,221,420 A | 12/1965 | Heinberg | 35/35 |
| 3,369,308 A | 2/1968 | Curran | 35/35 |
| 3,703,602 A | 11/1972 | Shenshev | 35/35 |
| 3,744,156 A | 7/1973 | Ottassi | 35/35 |
| 4,406,626 A | 9/1983 | Anderson et al. | 434/169 |
| 4,706,212 A | 11/1987 | Toma | 364/900 |
| 5,273,433 A | 12/1993 | Kaminski et al. | 434/169 |
| 5,286,205 A | 2/1994 | Inouye et al. | 434/157 |
| 5,433,609 A | 7/1995 | Deaver et al. | 434/156 |
| 5,486,872 A | 1/1996 | Moon | 348/564 |
| 5,608,700 A | 3/1997 | Ikeda | 369/24 |
| 5,697,789 A | 12/1997 | Samerth et al. | 434/157 |
| 5,810,599 A | 9/1998 | Bishop | 434/157 |
| 5,868,576 A | 2/1999 | Maruta | 434/157 |
| 5,873,728 A | 2/1999 | Jeong | 434/185 |
| 5,885,083 A | 3/1999 | Ferrell | 434/156 |
| 5,995,932 A | 11/1999 | Houde | 704/261 |
| 6,022,222 A | 2/2000 | Guinan | 434/169 |

OTHER PUBLICATIONS

Blakeslee, "When an Adult Adds a Language, It's One Brain and Two Systems,".
Kim, Karl H.S., et al., "Distinct Cortical Areas Associated with Nativ eand Second Languages," Department of Neurology, *Nature*, vol. 388, Jul. 10, 1997, pp 171–174.
Zilberman, Arkady, *Language Bridge*, 7 Days Publishing House, 1992.

*Primary Examiner*—Jacob K. Ackun, Jr.
*Assistant Examiner*—K Fernstrom
(74) *Attorney, Agent, or Firm*—Standley & Gilcrest LLP

(57) ABSTRACT

A method and system for learning a foreign language by first switching-off subconscious translation into a native language with the help of special drills consisting of simultaneous: reading of a lesson in a foreign language; listening to the recording of the same lesson; and repeating said lesson. The simultaneous reading, listening and repetition results in the formation of a new link image—word block in a foreign language, that after multiple repetition becomes engrained in the new language speech center in the brain so that the next time an adult encounters a similar situation, the corresponding word block in a foreign language is pronounced by the learner automatically in the same way that it occurs in the native language. The method and system is further comprised of the step of simultaneously listening to a lesson, repeating the lesson aloud and writing any words that a learner recognizes and can write down. The method allows the user to learn a foreign language using a one-language approach of a generic book written entirely in the predetermined foreign language.

5 Claims, 5 Drawing Sheets

Figure 1
LESSON 1
 LOVE
"First love is only a little foolishness and a lot of curiosity."
(George Bernard Shaw)
-Hello, my name is David.
-And my name is Jessica.
-I can count to ten: one, two, three, four, five, six, seven, eight, nine, ten.
VOCABULARY DRILLS
◁ *I love you.*
*I can count to ten.* ▷
◁ *First love is only a little foolishness and a lot of curiosity.* ▷
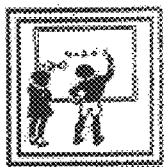
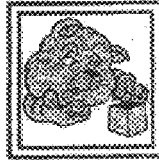

Figures 2

DRILLS TO LESSON 1

Drill 1
Read and repeat after the speaker the text given in vocabulary drills. Do this drill three or four times before you start working on the lesson itself.
You may look up some words in a dictionary but then try to visualize each sentence.

Drill 2
Repeat aloud the recorded text, using headphones and speaking simultaneously with the speaker, with a delay of one or two words and without stopping the tape. While doing this, follow the text with your eyes and imagine that you are participating in the situation; do not pay attention to all the details.

Drill 3
Continue repeating the recorded text simultaneously with the speaker many times until you can do it easily and without omissions.

Then do a few more repetitions with your eyes closed, without analyzing your own pronunciation.

◁ *Read the text*

*Repeat the text after the speaker.* ▷

◁ *Look up some words in a dictionary.*

*Try to visualize each sentence.* ▷

◁ *Repeat aloud the recorded text, using headphones.*

*Speak without stopping the tape.* ▷

◁ *Follow the text with your eyes.*

*Imagine your participating in the situation.* ▷

◁ *Do not pay attention to all the details.* ▷

◁ *Continue repeating the text simultaneously with the speaker many times.* ▷

◁ *Do a few more repetitions.*

*Repeat text again with your eyes closed.* ▷

METHOD AND SYSTEM FOR ACQUIRING A FOREIGN LANGUAGE

The present application is a continuation application claiming priority to application Ser. No. 09/435,660 filed on Nov. 8, 1999, now abandoned.

BACKGROUND AND SUMMARY OF THE INVENTION

The present invention relates to a method and system for learning a foreign language by first switching-off subconscious translation into a native language with the help of special drills consisting of simultaneous: reading of a lesson in a foreign language; listening to the recording of the same lesson; and repeating the lesson.

Learning a foreign language in adulthood (i.e. age twelve or older) is a difficult task for most people. Prevailing methods of language instruction are typically characterised by one common feature, i.e. comparison between the native language and a foreign language. Even in cases when instructions are given exclusively in a foreign language, e.g. so-called direct method or total immersion method used in Berlitz schools for more than hundred years, adults in most cases subconsciously translate foreign language into their native language. In other words, most adults encounter the difficulty in learning a foreign language while using conventional methods because they try to add a foreign language to their native language and labor under a number of misconceptions:

1.) Adults try to use the knowledge of a foreign language grammar which they have acquired as explanations in the native language. But this is practically impossible since there is no time for this kind of analysis during automatic fluent speech in a foreign language.

2.) Adults first formulate the sentence in the native language, then try to translate it quickly into a foreign language whereas they try to perform a grammatical analysis before attempting to speak the construed sentences in a foreign language. This formulation is practically impossible since, first, there is no time for this kind of analysis, and second, speech is a subconscious process that does not provide either time nor means for conscious activity.

The literature of the art of learning foreign languages documents various methods, beginning with the oldest, most traditional one—the translation method—to more modern ones, such as the audio-lingual method, the direct method and the total immersion method. The translation method is a classical language teaching method based on logical analysis of the language, memorization of complicated rules, explained in the native language, and conscious application of said rules in speech. According to this method adults attempt to formulate the sentence first in the native language, then translate it to a foreign language trying to analyze at the same time the grammatical structure of a sentence. For centuries this classical method was considered as a logical method of learning a foreign language by adults. Although this method is notoriously inefficient, it is the most widespread method used in most schools and colleges.

The audio-lingual method is aimed at teaching language skills in the order of listening, speaking, reading and writing. To this end, material is presented in a spoken form, and the emphasis in the early years is on the language as it is spoken in everyday situations, whereas reading and writing at this stage play supportive roles. At advanced levels, students are introduced to more literary forms of expression. At all stages, listening and speaking are done separately so that the main barrier in acquiring a foreign language—subconscious translation into the native language—is still in place and that is why although this method exhibits better efficiency in comparison to the translation method, especially for teenage learners, it has not found widespread application among adult learners of foreign languages.

The direct method attempts to develop in learners direct association of words and phrases with objects and actions without the use of the native language either by the teacher or the student. The ultimate goal according to this method is to develop the ability to think in the language terms, whether one is conversing, reading or writing. This method requires professional teachers who are trained to use the direct method in a class or group environment and is not practical for self-instructional study by adults. The direct method was successfully used in Israel for acquiring the Hebrew language during the influx of immigrants but did not reach the main stream of methods used in schools, colleges and language schools of the USA and Europe.

The total immersion method basically involves setting up informal situations where students communicate with each other and their teacher, and through this communication they acquire a new language. According to this method, a relationship of acceptance and equality between students and teacher, and among the students must exist. Trust, belief and confidence are key words. Since the student is not taught explicitly but learns through experience, the total immersion method is an active inductive approach to language acquisition. Implementation of this method also requires specially trained teachers and could be used in a class or group environment but is not practical for self-instructional study by adults. The total immersion method was first introduced by Benedectin Berlitz in 1892 when, after two weeks of vacation from a theological school, where he taught French language, he noticed remarkable progress in his class because his substitute teacher was a Frenchman without a knowledge of English. In spite of more than a century of application, the total immersion technique did not become universally used since it is not applicable for self-study and does not give an adult an instrument for overcoming the main barrier in learning a foreign language—the subconscious translation into the native language. According, in everyday life beyond the language school, where the total immersion method is used, a learner usually reverts back to his or her old habit of subconscious translation.

Another known statistical fact—if an adult lives in a foreign language environment, he or she becomes more or less fluent in the foreign language after N years, where N=age divided by 6 (age/6). So that a 30 year-old adult will speak a language in 5 years of natural immersion, and a 60 year-old adult after 10 years of total immersion. This explains why the total immersion method, successfully used in prestigious schools in many countries of the world for more than hundred years, still is far from the leading position among language acquisition methods.

The market of language learning further offers several audio-visual courses which are basically lessons filmed in live action. These courses teach all four language skills and make extensive use of dialogues as is done in a classroom. Many of these courses are used as a supplement to the class curriculum.

The prior art methods exhibit the following deficiencies, among others:

1.) They do not furnish an explanation to the problem: why most adults encounter difficulties in acquiring a foreign language.

2.) They do not furnish an instrument for adults to kick the habit of subconscious translation into and from the native language and to stop the fruitless attempts of adding a foreign language to the native language.

3.) They do not explain and use in acquisition methods the principle that people, who learn a second language in adulthood and speak it fluently, possess a second independent foreign language speech center in the brain. The fact that bilingual adults have two language centers in the brain was confirmed by scientists from Cornell University Medical College and Memorial Sloan-Kettering Cancer Center.

The results of their investigations were published in the journal Nature (Jul. 10, 1997, vol. 388, p. 171).

4.) They do not explain to adults that the mechanism of speech in the native language and in a foreign language should be the same—automatic, i.e., subconscious expression of images or code language of our thoughts.

5.) They do not explain to adults that attempts to memorize foreign words as translations into the native language are fruitless because while conversing in a foreign language there is no time for conscious construction of sentences in a foreign language and retrieval of memorized words from memory.

Furthermore, the methods described in the above art do not take into account the fact that speech is a mechanical process that is initiated by our thoughts and is controlled subconsciously. We use our conscious thoughts to start the process, but speech itself is executed automatically. When adults speak fluently in a foreign language they do not have time to perform any kind of linguistic analysis or to make comparisons with expressions they use in their native language.

The scientific discovery of a group of scientists from Cornell University Medical College and Memorial Sloan-Kettering Cancer Center helps us to understand why adults have difficulties in learning a foreign language. Babies who learn two languages simultaneously, and apparently effortlessly, activate a single brain region while speaking two languages. But people who learn a second language in adulthood possess two such brain regions, one for each language. The "New York Times" newspaper popularized this discovery on Jul. 15, 1997 in an article titled: "When an adult adds a language, it's one brain, two systems". The language teaching method of this invention implements this discovery into a practical method for forming and utilizing the language speech center in the brain. It gives an adult an instrument to turn off subconscious translation into his/her native language and to form a new language center.

More specifically, the invention relates to natural language acquisition method that does not require intervention or control by the memory: a foreign language is acquired not through memorization information about the language but through experiencing a foreign language. The system allows users unfamiliar with the language to progressively build an active vocabulary of foreign language words and phrases based on training a new link of word or word blocks with image or a situation.

If the language course does not explain to the students that subconscious translation into and from the native language is the main obstacle in acquiring a foreign language, then the students will face a major block on the route of mastering a foreign language. Moreover, adult students will revert to the subconscious translation into and from the native tongue even under conditions when a foreign language is learned by direct or immersion techniques and all explanations are given in a foreign language.

The language teaching method of the present invention provides students with a tool to kick the habit of understanding a foreign language by translating it into a native language. It is achieved by performing simultaneously three actions: reading, listening to the recorded text, and vocally repeating it with the speaker. Through multiple repetition of this simultaneous drill with increasing speed, a natural link between image and expression in a foreign language is formed in the subconscious. Subsequently, a student can utter corresponding word blocks in a foreign language automatically when the appropriate situation arises in real life. And that person will do so without conscious effort in the same way he does in his/her native language.

After graduating the conventional language courses that belong to the translation method students acquire a foreign language as information-based knowledge. As a result, when speaking after each foreign word they make an unnatural stop because they have to comprehend (i.e., to translate into the native language) the meaning of the word used in this particular sentence. That is why such a student cannot form the language speech center and speak fluently or without mistakes.

Using the teaching method of the present invention a student acquires foreign language words that are linked directly to the images or situations. For this reason, students make less mistakes in a foreign language, they speak without pauses between the words because they speak without thinking but rather by building a sentence from the word blocks acquired through multiple repetitions of the lessons.

Within the conservative known systems, learning a foreign language is based on information+analysis+memorization. Very few people can accomplish this because it is against our physiology. In our native language we don't recall words from memory nor make grammatical analysis of our speech. In other words, we first learn how to speak fluently in a foreign language. After acquiring an auditory "ring-a-bell-grammar" that will allow one to speak practically without mistakes, the student may start learning technical aspects of the foreign language grammar.

Accordingly, the method and system of the present invention provides a language acquisition system which allows the user to interact with the target language directly, using basically a one-language approach. The first part of the teaching method of the present invention, the Demo Kit, helps an adult student to develop the habit of simultaneously performing three actions—reading, listening and speaking the recorded text—first in the native language, and second in a foreign language. A student starts using this new ability in experiencing the foreign language in one-language environment created by lessons and drills of the generic textbook of the present invention that contains all lessons and drills in the foreign language of your choice.

Multiple, simultaneous repetition of the text after the speaker must be accompanied by writing down any words that a learner can recognize and write. Such a method of simultaneously writing down any words, while listening, and pronouncing the text (without stopping the tape) develops the skill of automatic correct writing in the target language.

In this regard, the present invention allows the user to progress in the building of an active vocabulary in a natural way as it is done in one's native language. According to the present invention, the student subconsciously assigns to the unknown word a certain image (or meaning) that is corroborated by all other words in the context and is validated by the student's subsequent experience.

More specifically, the invention in its preferred embodiment uses simultaneous reading, listening and repeating as a unique drill to form a foreign language speech center in the brain and makes one able to speak automatically without fruitless efforts to remember the grammar or words needed to express one's thoughts or feelings.

The invention also provides the user with means to form the internal-ear-grammar or ring-a-bell grammar that sends us a subconscious signal when we make a mistake because we speak by the association principle using our active word blocks as speech building blocks.

From the foregoing example of practical implementation it will be seen that the present invention provides a highly effective method of acquiring a foreign language without overloading ourselves with fruitless attempts to memorize as many foreign words and phrases as possible. Those attempts are fruitless because there is little correlation between the number of foreign words that a student is capable to link to corresponding words in his/her native language and the ability to speak fluently in a foreign language.

The simultaneous reading, listening and repetition results in the formation of a new link image=word block in a foreign language, that after multiple repetition becomes engrained in the new language speech center in the brain so that the next time a student/learner encounters a similar situation, the corresponding word block in a foreign language is pronounced by the learner automatically in the same way that it occurs in the native language.

The present invention relates to a method and system for learning a foreign language by first switching-off subconscious translation into a native language with the help of special drills consisting of simultaneous: reading of a lesson in a foreign language; listening to the recording of the same lesson; and repeating the lesson. The method and system is preferably comprised of the step of simultaneously listening to a lesson, repeating the lesson aloud and writing any words that a learner recognizes and can write down. By precluding conscious control over writing the learner develops the skill of automatically correct writing in the target language; this skill is similar to the skill which an adult uses subconsciously in his/her native language. According to the method all, four language skills, (i.e., reading, listening, speaking and writing) are acquired simultaneously in a natural way which corresponds to the brain physiology changes of an adult. The method further precludes comparison between the separate words of the native language and the target language, thus overcoming the main barrier in the formation of a new language center in the brain since bilingual information cannot be registered by the new language center in the brain. To avoid the ubiquitous misconception—learning of a foreign language is only possible through translation method—an adult student according to the teaching method of the present invention is gradually introduced to the one-language method of acquisition of a foreign language. The present invention relates to a method for learning a foreign language and, more particularly, to a method for learning a foreign language by first switching-off subconscious translation into the native language and second by developing a link of an image=word or word block in the target language, and third by precluding comparison between the separate words and the word blocks in the native language and a foreign language.

First, using a "Demo Kit" containing an introduction to the method of the present invention and a few lessons from the text book that are translated into student's native language, the student is familiarized with the learning method (i.e., the method of the present invention is first practiced in the native language so that the learner becomes somewhat accustomed to the learning technique; i.e., the simultaneous listening, reading and speaking). Second, students start using the generic book that contains all lessons and drills of the present invention that are given only in a foreign language and is supplemented with a pictorial context-type dictionary.

The language acquiring method and system of the present invention makes learning a foreign language simple since it gives the brain the right opportunity to form the language speech center and speak automatically without thinking. To achieve this goal students can use the printed version of the self-instructional book or a set of CDs for computer-aided learning. The computer version of the present invention uses programmed pages that contain the Demo Kit introduction and drills and the foreign language lessons and drills as well as a pictorial context-type dictionary. The programmed pages can be in various formats such as known word processing formats, known graphical formats, HTML or other web-based formats. In a preferred embodiment, the lesson pages will have links to translations and/or context-type dictionary passages. The computer-aided version may be run locally on a personal computer (PC), a networked version, or web server based via a web browser.

The method of the present invention is preferably comprised of:

a. providing a recording of a predetermined phrase in a predetermined foreign language;

b. providing a lesson book containing written text corresponding to the predetermined phrase in the predetermined foreign language; and c. providing instructions to the student to listen to the recording of the predetermined phrase and to simultaneously read the written text corresponding to the predetermined phrase in the predetermined foreign language found in the lesson book while simultaneously speaking out loud the predetermined phrase in the foreign language.

In the preferred embodiment, the recording has multiple, consecutive, recordings of the predetermined phrase in the predetermined foreign language.

The method of the present invention is also preferably comprised of:

providing further instructions to repeatedly listen to the predetermined phrase in the predetermined foreign language while simultaneously reading the written text corresponding to the predetermined phrase in the predetermined foreign language found in the lesson book and simultaneously speaking out loud the predetermined phrase in the predetermined foreign language. The present invention also preferably comes with instructions to write as many words found in the predetermined phrase in the foreign language while simultaneously listening to the predetermined phrase while simultaneously speaking the predetermined phrase out loud. A supplement is preferably provided which lists foreign words found in the predetermined phrase in the foreign language, and where the supplement also provides a translation of the foreign word in a predetermined language. The supplement also provides a use of the at least one foreign word in a predetermined sentence and wherein the supplement also provides a translation of the predetermined sentence in a predetermined native language.

The present invention may also be implemented via a computer-aided system having an audio output device, a processor, and display having a display screen. The computeraided system operates by:

a. providing a digital recording of a predetermined phrase in a predetermined foreign language, wherein the recording is capable of being played out loud to a student through the audio output device;

b. displaying a lesson in text on the display screen, the lesson corresponding to the predetermined phrase in the predetermined foreign language; and c. providing instructions to the student to listen to the recording of the predetermined phrase output through the audio output device and to simultaneously read the text corresponding to the predetermined phrase on the display screen while simultaneously speaking out loud the predetermined phrase in the foreign language.

All the drills contained in the written version of the present method may also be implemented via the computer-aided system of the present invention.

In addition to the features mentioned above, objects and advantages of the present invention will be readily apparent upon a reading of the following description.

BRIEF DESCRIPTION OF THE DRAWINGS

Novel features and advantages of the present invention, in addition to those mentioned above, will become apparent to those skilled in the art from a reading of the following detailed description in conjunction with the accompanying drawings wherein similar reference characters refer to similar parts and in which:

FIG. 1 is a sample lesson from a generic book or computer display according to the present invention.

FIG. 2 illustrates example of drill instructions according to the present invention.

DETAIL DESCRIPTION OF PREFERRED EMBODIMENT(S)

Figure 3:
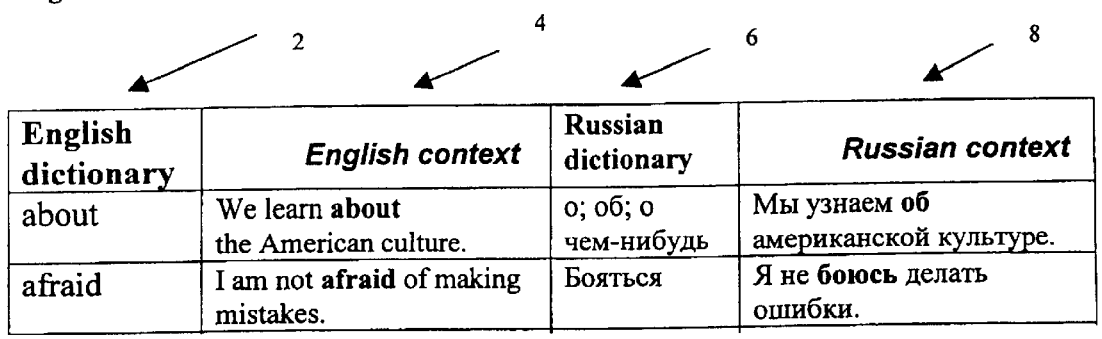
FIG. 3 illustrates an excerpt from a pictorial context-type English-Russian dictionary according to the present invention.

The preferred system herein described is not intended to be exhaustive or to limit the invention to the precise forms disclosed. They are chosen to describe and explain the principles of the invention, and the application of the method to practical uses, so that others skilled in the art may practice the invention.

The proposed practical method of foreign language acquisition is based on the following facts:

1.) An adult does not think in any particular language, she or he thinks in a code or image language acquired in the course of her or his own experience in childhood and enriched in adulthood. Said images are registered in the Wernicke center in the brain. The Wernicke center is directly connected to the Broca center in the brain—the language speech center; when an image is activated in the code language of our thoughts, the words in the native language appear automatically on the tip of our tongue thus creating the illusion that we think in the native language.

2.) An adult is usually unaware that in the native language we speak fluently because the speech is a subconscious process and the mechanism of speech in the native language and in a foreign language should be the same. That is why the most widespread method of foreign language acquisition—the translation method—contradicts our brain physiology and that is why it is notoriously inefficient.

3.) Bilingual information is stored in the short-term memory which has a characteristic feature: it keeps only that part of the information which is periodically used, while unused information is erased to free its limited storage capacity to temporarily store the current information.

Multiple "simultaneous" repetition of the text after the speaker (i.e., with a delay of one or two words) while using headphones and reading the text is the main training drill which helps an adult to form a new language speech center in the brain. To develop this habit an adult uses a Demo Kit containing an introduction and a few lessons from the generic text book in a student's native language. Practicing in the native language develops the habit of simultaneous repetition for easy transition to the one-language method using mainly the foreign language. The Demo Kit also contains a few introductory practice lessons in the predetermined foreign language to be learned. The repetition allows the student to say the foreign phrase easily without omissions and conscious effort to pronounce the text. An example of training drills according to the proposed method of the present invention for acquiring a foreign language is given below.

The purpose of the introductory drills is to kick the habit of subconscious translation and to restore in adults the capability to visualize the text of the lesson. After completing the introductory lessons and drills a student will have a rather limited vocabulary of about 150 words but most importantly he or she will be prepared to continue the foreign language acquisition by using the generic book of the present invention written exclusively in the foreign language of your choice.

The principles and operation of a method according to the present invention may be better understood with reference to the accompanying sample of a lesson and basic drills from the generic book given below (the introduction would explain the process of acquiring a foreign language according to the present invention and run the student through the drills in the student's native language so that the student becomes accustomed to the learning method). The sample of a lesson in FIG. 1 from the generic book is for students who want to learn the English language. FIG. 2 illustrates some of the drills of the present invention for each of the lessons (drills written in English). The typical drills to each lesson in the generic book are given below:

1. Read and repeat after the speaker the text given in vocabulary drills. Do this drill three or four times before you start working on the lesson itself. You may look up some words in a dictionary but then try to visualize each sentence.

2. Repeat aloud the recorded text of a lesson, using headphones and speaking simultaneously with the speaker ("simultaneous" as the term does not mean in exact unison, a delay of one or two words is acceptable). While doing this, follow the text with your eyes and imagine that you are participating in the situation; do not pay attention to all the details.

3. Continue repeating the recorded text simultaneously with the speaker many times until you can do it easily and without omissions. Then do a few more repetitions with your eyes closed, without analyzing your own pronunciation.

4. Now, while repeating the text along with the speaker and without stopping the cassette, write down as many words as you can that come to your mind. Repeat this drill at least three times and write down the new words each time.

5. Compare the words from Drill 4 with those of the text. Write down from the lesson all the words and word combinations that you missed and pronounce them aloud a few times.

6. Compose short sentences with the word combinations from Drill 5 and repeat them aloud several times as fast as you can, until a whole sentence sounds like a one-word block to you.

7. Compose short stories using the written word combinations from Drill 5. While doing this you may use parts of the original text or add word blocks from other lessons.

8. One-man-show. Using the word blocks, given to each lesson, expand them with the blocks from the lesson and act out the scenes. In acting out each scene, you may choose to be an actor, a singer, a dancer, a stage director, or an artist. First, use the word blocks from the current lesson to work through the scenes. Then you may use word blocks from other lessons.

9. Record your own short story using the word blocks of Drill 8 as your building blocks. Listen to your recording without criticizing or analyzing your mistakes in pronunciation or grammar.

10. To make certain you have mastered the lesson—please do the following—reproduce the whole lesson fluently while looking at the frame given at the right. If you have reproduced it fluently, this means that the words in those sentences have become your own word blocks and you may proceed to the next lesson. From now on, whenever a similar situation occurs in your life, you will express your thoughts in English automatically, without thinking. You will not have to make any conscious effort to pronounce them. Instead, the words will flow freely, called forth by the images and feelings experienced in the situation.

While an adult performs simultaneously the three functions of reading, listening to the recorded text and repeating it after the speaker, the subconscious translation into and from the native language is turned off. The word blocks after multiple repetition become engrained into the newly formed language speech center based on the formation of a link image=word or word block.

Acquisition of a foreign language by using one-language approach according to the proposed method of the present invention consists of two steps. First, using a "Demo Kit" containing an introduction to the method of the present invention and a few lessons from the text book that are translated into student's native language, the student is familiarized with the learning method. Second, students start using the generic book of the present invention that contains all lessons and drills of the present invention that are given only in a foreign language and is supplemented with a pictorial context-type dictionary. Since the first few lessons in the "Demo Kit" and in the generic book use the same text, it provides a smooth transition from the conventional method of acquiring a foreign language to this unique onelanguage approach described in the present application.

Mastering of a new lesson consists of the following steps:

A student works on vocabulary drills using simultaneous reading, listening to the recorded drills and repeating them after the speaker with a delay of one or two words. If a student encounters unknown word and can't visualize the situation, he or she may use a specially designed dictionary that is provided and contains both the word and the context, which are given in the foreign language and in students' native language. In a computer implemented version, the student may click on the unknown word (e.g., via a mouse) which will bring up the context-type dictionary explaining the corresponding word in the native language. The latter is used for clarifying a situation which is then experienced through simultaneous multiple repetition of the sentence in a foreign language. An example of excerpt from such a dictionary (for students who learn English as a second language (ESL) and whose native language is Russian) is illustrated in FIG. 3. Column 1 contains the foreign word 2, column 2 contains the word in the context of a sentence 4, column 3 provides the translation into a native language 6, and column 4 provides the translation of the contextual sentence 8.

Greg Thomson writes in his book "Language Learning in the Real World for Non-beginners" (1993): "Language learning is at once complex and simple. When I think of the complexity of language learning, I'm amazed that people succeed. Fortunately, the bulk of the complexity of language learning is handled by your brain, without your even being aware of it. You simply need to give your brain the right opportunity, and it takes over from there. That is where language learning becomes simple."

Figure 4:
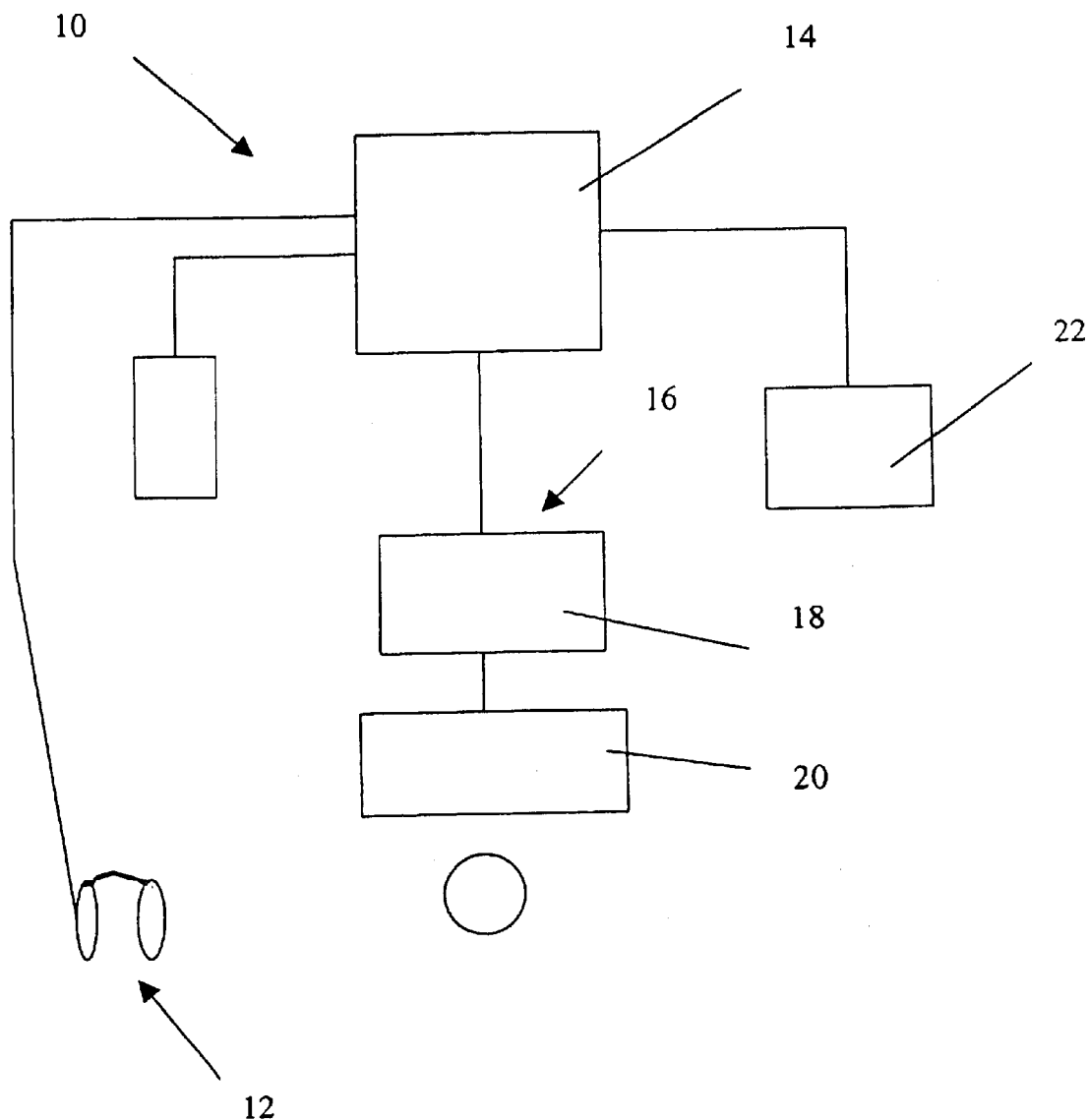
FIG. 4 depicts a block diagram of one embodiment of a computer-aided implementation of the present invention.

The present method of acquiring a foreign language makes learning a foreign language simple since it gives our brain the right opportunity to form the language speech center in the brain and speak automatically without thinking. To achieve this goal students can use the printed version of the self-instructional book or a set of CDs for computer-aided learning. The computer version of the present invention may use WEB-type pages on CDs that contain the introduction and introductory drills (both in a foreign language and in the native language), the generic book with recorded lessons and drills as well as context-type dictionaries in all major languages. FIG. 4 illustrates a block diagram of one embodiment of the computer-implemented version of the present invention 10.

The computer-aided system of teaching a foreign language is preferably comprised of a computer system having an audio output device 12, a processor 14, and display 16 having a display screen 18, keyboard 20, and a CD or DVD ROM drive 22 (the lessons may be burned onto a disk). The audio output device 12 may be headphones, speakers, or any other known audio output device. The system is adapted to:

a. provide a digital recording of a predetermined phrase in a predetermined foreign language through the audio output device 12;

b. displaying a lesson in text on the display screen 18, the lesson corresponding to the predetermined phrase in the predetermined foreign language; and providing instructions to the student to listen to the recording of the predetermined phrase output through the audio output device 12 and to simultaneously read the text corresponding to the predetermined phrase on the display screen 18 while simultaneously speaking out loud the predetermined phrase in the foreign language.

The other drills as discussed above for the written materials may also be implemented through the computer system 10. For example, the drill of writing or typing as many words found in the predetermined phrase in the foreign language while simultaneously listening to the predetermined phrase while simultaneously speaking the predetermined phrase out loud.

In the preferred embodiment of the computer-aided system of the present invention, a link (e.g., HTML link-not shown) is provided from at least one foreign word found in the predetermined phrase in the foreign language displayed on the display screen 18. Clicking on this link initiates a second display on the display screen that provides a translation of foreign word to a corresponding word in a native language. It is preferred the second display also provides a use of said at least one foreign word in a predetermined sentence and wherein said second display also provides a translation of the predetermined sentence into a predetermined native language. The translation is displayed for a certain period of time (default 10 seconds), then the original sentence in the foreign language is displayed and a student is asked to repeat it many times until he or she pronounces it as a one-word-block. This facilitates the formation of image=word link in student's subconscious mind.

Figure 5:
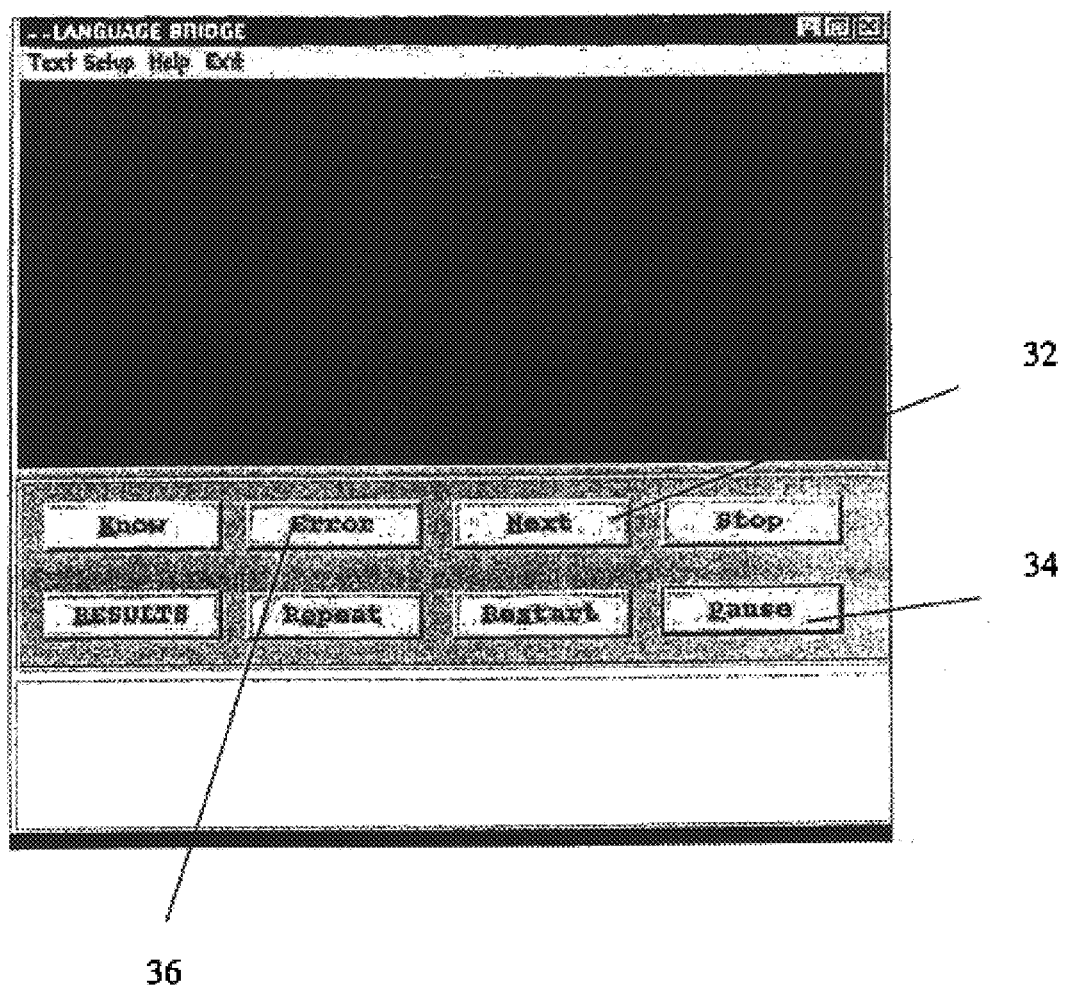
FIG. 5 depicts a screen shot of the main page of one embodiment of the testing program of the present invention.

The computer version of the present invention is supplemented with the testing program that can be used on any PC in a classroom or during self-instruction at home. FIG. 5 illustrates a screen shot of the main page of one embodiment of the testing program of the present invention. The computer-testing program fulfills two objectives. First, it offers a good training tool in acquiring the skill of combining the meaning of the words flashing on the screen with their respective images acquired while working on lessons and drills. Second, the program provides a quantitative measure of student's progress in acquiring active vocabulary and ability to speak automatically. This computer testing program can be used periodically (for example after every third or fifth lesson). On the basis of the student's progress, the teacher or the tester can choose the database dictionary for the testing of active vocabulary growth.

Before using the testing program students are given the following instruction: "When you see a flashing word on the screen—visualize the image this word creates in your mind and say one or two sentences with this word to demonstrate your understanding of the word's meaning." The teacher or tester presses the "Know" button 30 after each correct answer. If the student does not know the flashing word—the "Next" button 32 is pressed; if the student needs additional time to give the answer—the "Pause" button 34 is pressed; to continue testing—the "Pause" button 34 is pressed again. If the student makes a grammar mistake—the "error" button 36 is pressed. The student is instructed: "In formulating your answer you should not analyze the grammar structure of the sentences. Speak as fast as possible. This technique will enable you to acquire a natural habit of speaking automatically."

In contrast to the conventional language courses on CDs that reinforce the translation method based on memorization and analysis, the computer version of the present invention is designed to experience one-language approach to acquiring a foreign language by experiencing it in the natural way.

Having shown and described a preferred embodiment of the invention, those skilled in the art will realize that many variations and modifications may be made to affect the described invention and still be within the scope of the claimed invention. Thus, many of the elements indicated above may be altered or replaced by different elements which will provide the same result and fall within the spirit of the claimed invention. It is the intention, therefore, to limit the invention only as indicated by the scope of the claims.

What is claimed is:

1. A method of teaching a predetermined foreign language to a student to prevent the subconscious translation of the predetermined foreign language into and from the native language and comprising the steps of:
   a. developing in the student the skill of simultaneous reading, listening and repeating of recorded text in the native language, said step of developing further comprising the step of instructing the student to simultaneously and repeatedly read, listen and speak out loud the recorded text in the native language;
   b. following the step of a., using an acquired skill of simultaneous reading, listening and repeating the recorded text in the native language in learning the predetermined foreign language, said step of using the acquired skill further comprising the steps of:
      i. providing a lesson book containing written text corresponding to a predetermined word or phrase in the foreign language;
      ii. providing instructions to the student to listen to a recording of the predetermined word or phrase in the foreign language and to simultaneously read the written text corresponding to the predetermined word or phrase in said lesson book while simultaneously speaking out loud the predetermined word or phrase;
      iii. after providing the instruction of step ii., providing instructions to preclude conscious control over writing by developing the skill of automatically writing in the foreign language, this step further comprising the step of instructing the student to write as many words or phrases recognized in the predetermined word or phrase while simultaneously listening to the predetermined word or phrase and speaking the predetermined word or phrase out loud.

2. A method according to claim 1 wherein said method is used for a computer-aided system of learning the foreign language by training the four language skills of reading, listening, speaking and writing required to speak the foreign language, comprising the steps of:
   a. providing a computer-aided system for learning the foreign language, said computer-aided system comprised of a display for displaying the predetermined word or phrase in the foreign language;
   b. instructing the student to click on any unrecognized word or phrase in the foreign language;
   c. displaying a pictorial context-type dictionary displaying a corresponding word or phrase in the native language corresponding to the unrecognized word or phrase;
   d. explaining the corresponding word or phrase in the native language and displaying it for a certain period of time;
   e. displaying the unrecognized word or phrase in the foreign language and instructing the student to repeat it many times with increasing speed designed to progressively build an active vocabulary of foreign language words and phrases based on linking the unrecognized word or phrase in the predetermined foreign language with an image or a situation illustrated by the pictorial context-type dictionary, wherein the unrecognized word becomes a part of the student's active vocabulary upon the completion of steps c. through e. of this claim;
   f. providing further instructions to write or type as many words recognized in the predetermined word or phrase in the foreign language while simultaneously listening to the predetermined word or phrase while simultaneously speaking the predetermined word or phrase out loud.

3. A method according to claim 2 of a computer-aided system of testing the student's progress in acquiring active vocabulary of the foreign language and ability to speak automatically, comprising the steps of:
   a. randomly selecting a word from the pictorial context-type dictionary compiled on the basis of lessons and drills included in the lesson book;
   b. causing the randomly selected word to flash on the display;

c. instructing the student to compose a phrase or a sentence containing the flashing word on the display that exhibits the student's understanding of the meaning of the flashing word;

d. instructing the student to pronounce the composed phrase or sentence orally or to write it or type it;

e. clicking a button on the display labeled "know" if the student composes the composed phrase or a sentence in a predetermined time period that correctly reflects the meaning of the flashing word on the display;

f. clicking a button on the display labeled "error" if the student composes the composed phrase or a sentence in a predetermined time period that correctly reflects the meaning of the flashing word on the display but contains a grammatical error;

g. clicking a button on the display labeled "next" if the student does not compose the composed phrase or a sentence in a predetermined time period or if the composed phrase or a sentence incorrectly reflects the meaning of the flashing word on the display; and h. providing a measure of the student's knowledge of active vocabulary of the foreign language based on the testing steps a. through g of this claim.

4. A method according to claim 1 wherein said method allows the user to learn a foreign language using a one-language approach of a generic book written entirely in the predetermined foreign language, comprising the steps of:

a. instructing the student to complete an introductory group of lessons and drills containing explanations in the native language;

b. continuing foreign language learning by using the generic book containing said introductory group of lessons plus additional lessons written exclusively in the predetermined foreign language;

c. instructing the student to work on vocabulary drills given to each lesson in the generic book using simultaneous reading, listening and repetition after the speaker; and d. instructing the student to work on lessons given in the generic book exclusively in the predetermined foreign language and training the student in simultaneous reading, listening, and speaking in the predetermined foreign language.

5. A method according to claim 4, further comprising the step of:

a. instructing the student to work on lessons given in the generic book exclusively in the predetermined foreign language and training the student in simultaneous writing, listening, and speaking in the predetermined foreign language.

\* \* \* \* \*